US012103016B2

(12) United States Patent
König

(10) Patent No.: US 12,103,016 B2
(45) Date of Patent: Oct. 1, 2024

(54) OUTLET NOZZLE FOR A CENTRIFUGE BOWL, NOZZLE INSERT, CENTRIFUGE BOWL, MOUNTING TOOL, AND METHOD FOR MOUNTING AN OUTLET NOZZLE

(71) Applicant: Flottweg SE, Vilsbiburg (DE)

(72) Inventor: Thomas König, Vilsbiburg (DE)

(73) Assignee: Flottweg SE, Vilsbiburg (DE)

( * ) Notice: Subject to any disclaimer, the term of this patent is extended or adjusted under 35 U.S.C. 154(b) by 845 days.

(21) Appl. No.: 17/264,888

(22) PCT Filed: Aug. 12, 2019

(86) PCT No.: PCT/EP2019/071541
§ 371 (c)(1),
(2) Date: Feb. 1, 2021

(87) PCT Pub. No.: WO2020/035433
PCT Pub. Date: Feb. 20, 2020

(65) Prior Publication Data

US 2021/0299679 A1 Sep. 30, 2021

(30) Foreign Application Priority Data

Aug. 13, 2018 (DE) ..................... 10 2018 119 620.2

(51) Int. Cl.
*B04B 1/10* (2006.01)
*B04B 7/12* (2006.01)

(52) U.S. Cl.
CPC . *B04B 1/10* (2013.01); *B04B 7/12* (2013.01)

(58) Field of Classification Search
CPC .. B04B 1/10; B04B 7/12; B04B 11/02; B04B 11/04; B04B 2001/2091
See application file for complete search history.

(56) References Cited

U.S. PATENT DOCUMENTS

| | | | | |
|---|---|---|---|---|
| 2,695,748 | A | 11/1954 | Millard | |
| 4,438,884 | A * | 3/1984 | O'Brien | F16B 21/04 285/376 |
| 4,776,412 | A | 10/1988 | Thompson | |
| 6,216,959 | B1 * | 4/2001 | Garrison | B04B 1/10 81/463 |
| 2009/0140081 | A1 | 6/2009 | Turcic et al. | |
| 2015/0097061 | A1 * | 4/2015 | Reid | B05B 15/18 239/589 |
| 2019/0099763 | A1 | 4/2019 | Franko | |
| 2020/0023384 | A1 * | 1/2020 | Ketterer | B04B 1/10 |

(Continued)

FOREIGN PATENT DOCUMENTS

| | | | |
|---|---|---|---|
| CA | 2084974 | C | 5/1998 |
| CN | 2832308 | | 11/2006 |
| CN | 101060934 | A | 10/2007 |

(Continued)

*Primary Examiner* — Walter D. Griffin
*Assistant Examiner* — Shuyi S. Liu
(74) *Attorney, Agent, or Firm* — Smartpat PLC

(57) ABSTRACT

An outlet nozzle (40) for a centrifuge bowl (60) comprises a nozzle insert (10) and a nozzle holder (30). The nozzle insert (10) can be exchangeably fixed, in particular clamped, in the nozzle holder (30), and the outlet nozzle (40) has a flow channel (11) which determines the exit angle (δ) of the outlet nozzle (40), said flow channel (11) of the outlet nozzle (40) being formed, in particular, by the nozzle insert (10).

16 Claims, 10 Drawing Sheets

(56) References Cited

U.S. PATENT DOCUMENTS

2021/0178407 A1 6/2021 Ketterer

FOREIGN PATENT DOCUMENTS

| | | | |
|---|---|---|---|
| CN | 203253537 | U | 10/2013 |
| DE | 7112972 | U | 7/1971 |
| DE | 3237213 | A1 | 5/1983 |
| WO | 2017165631 | A1 | 9/2017 |
| WO | 2017186459 | A1 | 11/2017 |

* cited by examiner

OUTLET NOZZLE FOR A CENTRIFUGE BOWL, NOZZLE INSERT, CENTRIFUGE BOWL, MOUNTING TOOL, AND METHOD FOR MOUNTING AN OUTLET NOZZLE

TECHNICAL FIELD

The disclosure relates to an outlet nozzle for a centrifuge bowl, comprising a nozzle insert and a nozzle holder. Furthermore, the disclosure relates to a nozzle insert, in particular for an outlet nozzle. The disclosure further relates to a centrifuge bowl, a tool for mounting and dismounting an outlet nozzle, as well as a method for mounting an outlet nozzle in a centrifuge bowl.

BACKGROUND

Separator bowls or centrifuge bowls for centrifuges are sufficiently known from the state of the art. It is furthermore known that various embodiments exist with respect to separators. Apart from manual separators, there exist, for example, automatic self-emptying separators and nozzle separators. The respective separator type is selected depending on the separating task to be fulfilled.

Nozzle separators are employed, for example, for separating and at the same time concentrating liquid mixtures. Due to their type of construction, nozzle separators are able to process very large throughput volumes including high solid concentrations. The product flowing in is separated within the bowl, the specifically heavy component of the mixture being transported radially outward toward the bowl inner wall. The specifically lighter components of the mixture in turn are transported radially inward.

Due to the outlet nozzles placed in the bowl wall, the accumulated solid substance is continuously discharged to the outside. Since only a defined amount of solid substance can be discharged through a bore in the nozzle, the solid substance accumulates in front of this nozzle and is concentrated at the same time. Such a concentrate is discharged radially to the outside through a channel formed within the nozzle.

Nozzles, i.e. outlet nozzles for centrifuge bowls, include in this respect, for example, hard metal inserts, which are soldered in place. These hard metal inserts are also designated nozzle brick. The soldering in of such hard metal inserts is a very complicated process requiring, on the one hand, a special preparation of the parts to be soldered in, and, on the other, special knowledge with respect to the soldering process. The nozzle brick causes a clogging risk of the channel, since accumulations of the solid substance in the area in front of the nozzle brick are possible. Vortex formations or flow stalls in case of inserted nozzle bricks or nozzle elements are also known in this context.

SUMMARY

Starting from the depicted state of the art, the task of the present disclosure is to propose an outlet nozzle for a centrifuge bowl, which is formed to be flow-optimized, on the one hand, and to be simply exchangeable, on the other.

Furthermore, it is a task of the present disclosure to propose a nozzle insert for an outlet nozzle, which is optimized with respect to the delineated task.

It is moreover a task of the present disclosure to propose a further developed centrifuge bowl as well as a further developed tool for mounting and dismounting an outlet nozzle.

Further, it is a task of the present disclosure to propose a method for mounting an outlet nozzle into a centrifuge bowl.

This disclosure is based on the idea of proposing an outlet nozzle for a centrifuge bowl, wherein the outlet nozzle comprises a nozzle insert and a nozzle holder. The nozzle insert is fixed exchangeably, in particular clamped in the nozzle holder. The outlet nozzle has a flow channel, which determines the exit angle of the outlet nozzle, said flow channel of the outlet nozzle being formed by the nozzle insert.

In other words, the outlet nozzle is composed of at least two elements, these are a nozzle insert and a nozzle holder. The flow channel of the outlet nozzle is in particular completely formed by the nozzle insert. The flow channel of the outlet nozzle is defined such that the flow channel is the channel of the outlet nozzle, which determines the exit angle of the outlet nozzle. The exit angle relates to the angle, which is formed by the medium exiting the outlet nozzle in relation to a horizontal axis of the outlet nozzle.

The nozzle holder serves in particular to attach the nozzle insert within the centrifuge bowl. Furthermore, the nozzle holder serves the purpose of exactly positioning the nozzle insert in relation to the centrifuge bowl. Preferably, the nozzle insert is completely located within the nozzle holder. In other words, the nozzle insert is radially surrounded completely by a nozzle holder. Only the inlet opening of the nozzle insert, that is the opening through which a medium to be discharged enters, is free or not surrounded by the nozzle holder.

The flow channel of the outlet nozzle preferably is formed to be free from edges and/or corners and/or separating joints and/or connecting joints. In other words, the flow channel is formed without any edges and/or corners. Due to the formation without any edges and/or corners and/or separating joints and/or connecting joints, the flow channel is formed to be flow-optimized.

Preferably, the outlet nozzle does not have a nozzle brick. Accordingly, the outlet nozzle has no element which interrupts the flow channel in sections or forms edges and/or corners and/or separating joints and/or connecting joints within the flow channel.

The wall of the flow channel preferably is formed as a completely defined 3D freeform surface. The 3D freeform surface is defined to be extending from an inlet opening to an outlet opening.

The inlet opening relates to the opening of the flow channel as well as to the opening of the nozzle insert through which a separated medium enters from the centrifuge bowl into the outlet nozzle. The outlet opening of the nozzle insert relates to the opening through which the medium exits from the flow channel and thus from the nozzle insert. The inlet opening has in this case a larger diameter than the outlet opening. Preferably, both the inlet opening and the outlet opening are formed as openings with a circular cross-section.

The inlet opening can be formed centrally or eccentrically to a cylindrical external surface of the nozzle insert.

In a state of use of the nozzle insert, i.e. in the installed state of the nozzle insert and thus the outlet nozzle into a bowl wall, two guide curves can be recognized in a horizontal cross-section through the nozzle insert. These are a first guide curve in the rotational direction of the centrifuge bowl. It may also be designated as a front guide curve. Moreover, a second guide curve in relation to the rotational direction is formed, that is a rear guide curve. Both the first or front guide curve and the second or rear guide curve each are formed of a plurality of partial guide curves.

The diameter of the outlet opening preferably is formed by a sectional surface of a spherical cavity. It is in particular possible for the nozzle insert to be variably adaptable with respect to the diameter of the outlet opening, since the spherical cavity first may be closed, and may be variably cut to length depending on the case of use of the nozzle insert.

The exit angle of the outlet nozzle is formed by the axis running through the center of the diameter of the outlet opening, and by a substantially planar cap surface of the nozzle insert. In the mounted state, the cap surface is an outer cap surface, i.e. the surface of the nozzle insert facing away from the inlet opening. Preferably, the exit angle of the outlet nozzle is from 15° to 20°, in particular from 16° to 19°, in particular 17.5°.

The angle of the radially situated partial guide curves leading to the diameter of the outlet opening, tangentially relative to the center axis of the diameter of the outlet opening, are in each case from 10° to 20°, in particular from 10° to 18°, in particular from 14° to 16°, in particular 15°.

The partial guide curves forming the guide curves are connected by differently large radii. In this case, the radius of the first, i.e. the front guide curve can be larger than the radius of the second, i.e. the rear guide curve.

Due to the formation of the wall of the flow channel as a completely defined 3D freeform surface, no corners or edges are present. The solid substance can thereby flow uniformly through the flow channel toward the outlet opening and exit from the nozzle insert and consequently from the outlet nozzle.

The nozzle holder may in particular be formed from a chrome-nickel steel. The nozzle insert preferably is manufactured from a hard metal or ceramics or glass ceramics.

Due to the formation of the nozzle insert according to the disclosure, it can be manufactured in one step together with the flow channel. This is preferably performed by pressing powder, in particular hard metal powder, followed by a sintering process. It is, for example, possible to initially produce two half shell forms so as to connect them subsequently in a sintering process. This is preferably performed such that after the sintering process no connecting joints and/or separating joints are formed in the produced nozzle insert.

The nozzle insert preferably has a positioning element, in particular a positioning pin which is positioned in a positioning opening of the nozzle holder when in a state fixed within the nozzle holder. The positioning pin may also be designated as a positioning lug.

On the outer circumferential surface, the nozzle insert preferably has at least two grooves. In these grooves, sealing elements, in particular O-rings can be positioned. This enables the nozzle insert to be positioned in a clamping manner within the nozzle holder.

In comparison to known outlet nozzles of the state of the art, it is thus not necessary to glue the nozzle insert within the nozzle holder or to solder it with the nozzle holder. In the event of a corresponding wear condition of the nozzle insert, it can simply be exchanged, since the nozzle insert can be removed from the nozzle holder. Due to the formation of a positioning element on the nozzle insert and a positioning opening within the nozzle holder, it is possible that the nozzle insert can be positioned exactly in relation to the nozzle holder. The flow channel and in particular the exit angle of the flow channel can thus be formed by the nozzle insert, since an exact positioning of the nozzle insert in relation to the nozzle holder is possible.

The outlet opening of the nozzle holder and the exit opening of the nozzle insert thus inevitably always have concurrent orientations due to the mutual exact positioning. Thus, the exit angle of the outlet nozzle can be constituted by the flow channel constituted by the nozzle insert.

The positioning element, in particular the positioning pin/the positioning lug, preferably is formed on the cap surface of the nozzle insert.

The positioning opening of the nozzle holder preferably is formed as a part of a positioning channel, wherein a component of a tool is inserted or insertable in a further positioning opening of the positioning channel.

The exit angle of the outlet nozzle and thus the exit orientation of the solid substance are always formed opposite to the direction of rotation of the centrifuge bowl. The thrust due to the material exiting the outlet nozzle, may thus be utilized with respect to the drive of the bowl in the rotational direction. In other words, the centrifuge bowl is additionally accelerated due to the product exiting the outlet nozzle. To be able to utilize this backward thrust, it is necessary for the outlet nozzle to be exactly positioned. This concerns the positioning of the nozzle insert in relation to the nozzle holder, on the one hand, and the positioning of the nozzle holder in relation to the centrifuge bowl, in particular to the bowl wall, on the other.

For this purpose, the further positioning opening of the positioning channel is formed so that a component of a tool, namely a mounting tool, is inserted or insertable.

For mounting the outlet nozzle into the wall of the centrifuge bowl, i.e. for connecting the outlet nozzle to a centrifuge bowl, the nozzle holder has an external thread. This external thread is formed to be complementary to an internal thread of an opening of the bowl wall. With an already fixed nozzle insert, the nozzle holder can be screwed into the centrifuge bowl. The outlet nozzle, which is formed of a nozzle insert and a nozzle holder, can in particular be screwed into a lower bowl part of a centrifuge bowl by means of a tool.

A further, in particular subordinate aspect of the disclosure relates to a nozzle insert for an outlet nozzle. The nozzle insert is in particular formed such as already described above in conjunction with the outlet nozzle.

A channel of the nozzle insert is formed such as to constitute the flow channel of the outlet nozzle, wherein the flow channel determines the exit angle of the outlet nozzle. The channel of the nozzle insert is in particular formed to be free from edges and/or corners. Preferably, a nozzle brick is not formed within the nozzle insert.

The wall of the channel of the nozzle insert is preferably formed as a completely defined 3D freeform surface. The nozzle insert is in particular formed from hard metal.

A further aspect of the disclosure relates to a centrifuge bowl with a bowl wall having a plurality of circumferentially distributed openings for receiving outlet nozzles. At least one of the received outlet nozzles is an outlet nozzle. The outlet nozzles are in particular formed in the lower bowl part of the centrifuge bowl.

On the external bowl surface of the centrifuge bowl, recesses each are formed contrary to the direction of rotation of the centrifuge bowl in the area of the openings, which recesses constitute contact edges and/or contact surfaces for a tool. Such a formation of recesses makes it possible that an outlet nozzle can be inserted by means of a special tool solely in one special direction and can be withdrawn again in the same direction. The installation direction of the outlet nozzle consequently is enabled by a special geometry of the nozzle holder, by a special geometry of an associated tool as well as due to the recess formed on the external bowl surface and the contact edges that are thereby formed. An exact positioning of the outlet nozzle is in particular necessary for defining the exit angle of the outlet nozzle. Thus, the solid substance jet exiting the outlet nozzle can be prevented from impinging upon the lower bowl part of the centrifuge bowl.

The formation of at least two sealing elements, in particular of two O-rings, allows the nozzle insert to be sealed in relation to the nozzle holder.

Due to the formation of a positioning element, which is in particular formed eccentrically to the longitudinal axis of the nozzle insert, the position of the nozzle insert within the nozzle holder is unequivocally defined.

The recess on the external bowl surface is configured such that the outlet nozzle cannot be screwed too deeply into the bowl wall, in particular into the lower part of the bowl. Preferably, a special tool is used for this purpose.

A further aspect of the disclosure relates to a tool for mounting and dismounting an outlet nozzle, in particular an outlet nozzle as disclosed, into or from an opening of a bowl wall of a centrifuge bowl, in particular a centrifuge bowl as disclosed.

The tool according to the disclosure has a mounting surface, wherein a spring-loaded latching element, in particular a spring-loaded ball and a further latching element, in particular a cylinder pin or threaded pin are formed on the mounting surface. That surface of the tool is to be designated as a mounting surface which rests against a horizontal planar surface of the nozzle holder in a state resting upon the outlet nozzle.

The spring-loaded latching element, in particular the spring-loaded ball, snaps into the positioning channel of the nozzle holder when the outlet nozzle is inserted into the tool. This prevents the outlet nozzle from slipping off the tool.

The further latching element, in particular the cylinder pin or threaded pin, makes it possible that the outlet nozzle, in particular the nozzle holder, can solely be inserted into the tool in a single defined position. The opening of the nozzle holder, which is formed to be complementary to the further latching element, in particular to the additional cylinder pin or threaded pin, preferably has another diameter than the positioning opening of the positioning channel into which the spring-loaded latching element is insertable.

Preferably, the opening associated to the further latching element is smaller than the positioning opening of the positioning channel so that the spring-loaded latching element can solely be inserted into the larger positioning channel, and at the same time the additional latching element can solely be complementarily inserted into the opening of the nozzle holder which has a smaller diameter.

On the mounting surface of the tool, at least two clamping elements, in particular at least two clamping lugs are preferably formed for forming a dovetail-like guide, wherein the clamping elements preferably are formed additionally as contact elements defining a positioning depth of the outlet nozzle, in particular of the nozzle holder.

Due to a dovetail-like guide and a dovetail-like guide on the nozzle holder, which is formed to be complementary to the first dovetail-like guide, it is possible that the outlet nozzle can be pushed onto the mounting tool solely in one direction. In addition, due to the formation of clamping elements formed as contact elements, the positioning depth of the outlet nozzle, in particular of the nozzle holder, can be defined due to the height of the clamping elements and the recesses on the external bowl surface, which are formed to be complementary thereto, while forming contact edges and/or contact surfaces.

The recesses and thus the contact edges and/or contact surfaces are formed such that, when the contact elements of the mounting tool are resting upon the contact edges or the bottom of the recess, it is not possible to insert the outlet nozzle further into the opening of the bowl wall of the centrifuge bowl.

Due to the dovetail-like guide and a dovetail-like guide on the nozzle holder, which is formed to be complementary to the first dovetail-like guide, the nozzle holder and thus the outlet nozzle cannot be detached unintentionally from the tool.

The outlet nozzle can be mounted to and dismounted from the tool, in a feeding or inserting direction, respectively, due to the formation of recesses on the external bowl surface in the area of the openings against the direction of rotation, and due to the formation of clamping elements. The movement of the outlet nozzle attached to the tool for opening the bowl wall is performed in the rotational direction of the centrifuge bowl. At the same time, the nozzle insert is arrested in the nozzle holder and thus on the mounting tool in an unequivocal and captively mounted manner.

A further aspect of the disclosure relates to a method for mounting at least one outlet nozzle into a centrifuge bowl, comprising the steps of:

a) providing a centrifuge bowl according to the disclosure;

b) providing an outlet nozzle according to the disclosure;

c) attaching a tool according to the disclosure to the outlet nozzle, namely to the nozzle holder of the outlet nozzle; and d) screwing in the outlet nozzle into an opening of the bowl wall until a defined positioning depth is reached.

This results in similar advantages or those advantages which have already been described in conjunction with the tool according to the disclosure, the centrifuge bowl according to the disclosure, and the outlet nozzle according to the disclosure.

Step b) of the method may in particular comprise the process of mounting a nozzle insert according to the disclosure into a nozzle holder. Consequently, in step c), the nozzle insert mounted into the nozzle holder preferably is attached to the tool.

The method may moreover comprise step e), wherein in step e), the tool is removed after performing step d). The tool can only be removed in the event of the outlet nozzle being correctly positioned within the opening and the tool being accordingly positioned in relation to the contact edges of the bowl wall.

BRIEF DESCRIPTION OF THE DRAWINGS

The invention will be explained below in more detail using exemplary embodiments with reference to the attached schematic drawings.

DETAILED DESCRIPTION

Figure 1A:
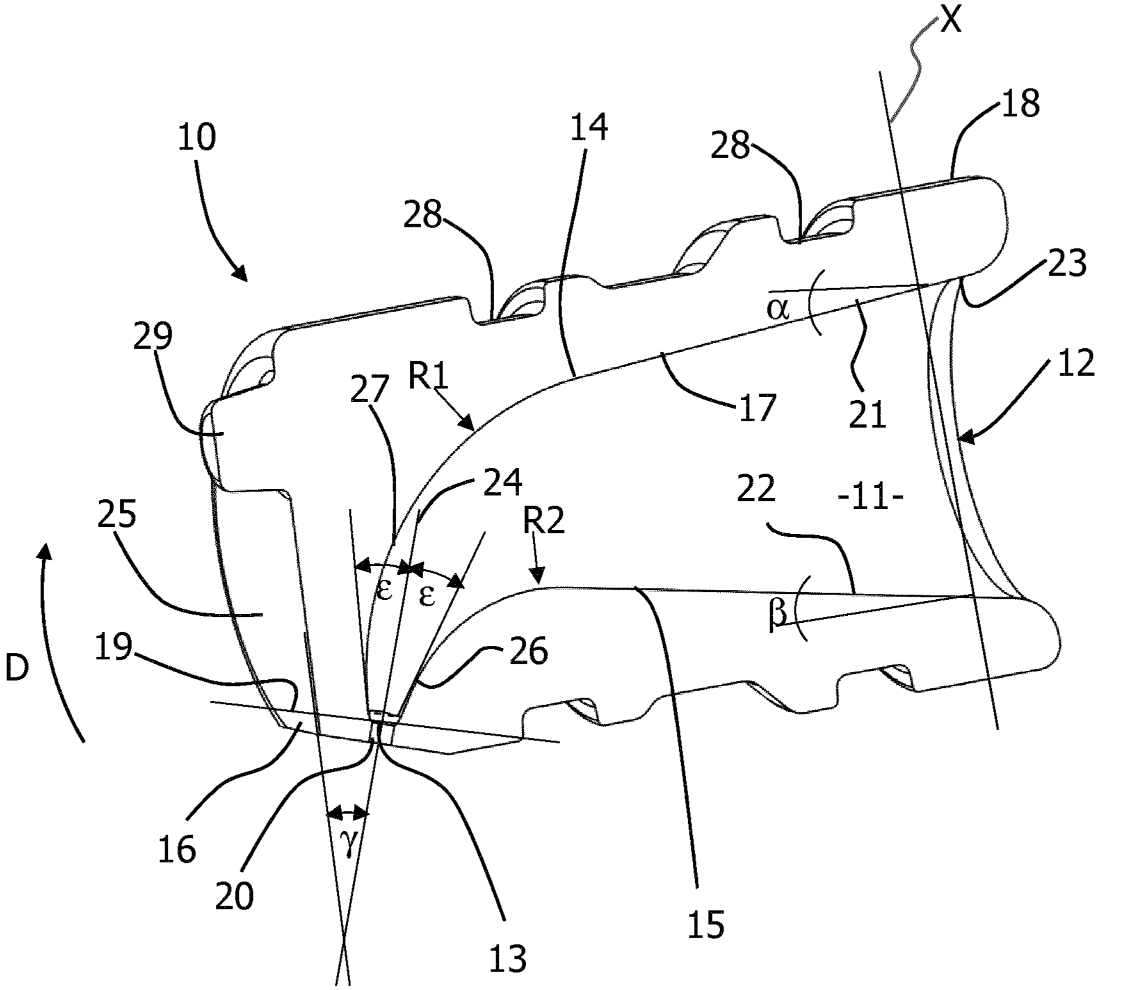
FIG. 1*a* shows a cross-section through a possible embodiment of a nozzle insert.

Hereinafter, the same reference numerals will be used for identical parts or parts of identical action.

FIG. 1*a* shows a cross-section through a possible embodiment with respect to a nozzle insert 10. This nozzle insert 10 serves for forming an outlet nozzle 40. For this purpose, the nozzle insert 10 is fixed within a nozzle holder 30 (see FIG. 1*c* in this context).

The nozzle insert 10 has a channel 11. This channel 11, when in the state inserted into the nozzle holder 30, forms the flow channel of the outlet nozzle 40. The channel 11 of the nozzle insert 10 thus is the flow channel of the outlet nozzle 40.

An inlet opening 12 can likewise be recognized. An outlet opening 13 is moreover indicated. In the state illustrated in FIG. 1*a*, the outlet opening 13 is closed. The process of opening the outlet opening 13 is performed by a ledge 16 being cut to length. Due to various possibilities of cutting to length of the ledge 16, different diameters can be formed with respect to the outlet opening 13.

In other words, the outlet opening 13 is formed by the sectional surface 19 through the spherical cavity 20.

Both the inlet opening 12 and the outlet opening 13 have a circular cross-section. The diameter of the inlet opening 12 is larger than the diameter of the outlet opening 13. The wall 17 forming the channel 11 is in particular formed as a completely defined 3D freeform surface. Due to that, the channel 11 is formed without any corners. Furthermore, no further elements, such as, e.g., nozzle bricks, are present within the channel 11 or the nozzle insert 10.

The 3D freeform surface, such as it is defined in conjunction with a CAD program, is in particular defined by a front guide curve 14 and a rear guide curve 15. As the front guide curve 14, the guide curve is designated, which in the state of use of the nozzle insert 10 is in the direction of rotation D of a bowl arranged in front, thus first in the direction of rotation. As the rear guide curve 15, the guide curve is designated, which in relation to the direction of rotation is arranged or formed behind the front guide curve 14.

In the illustrated example, the inlet opening 12, through which the material, to be separated, of the centrifuge bowl enters the outlet nozzle 40, is formed to be eccentrical to the substantially cylindrical external surface 18 of the nozzle insert 10. The front guide curve 14 as well as the rear guide curve 15 each start at the inlet opening 12 and terminate at the outlet opening 13. Both the front and the rear guide curves 14 and 15 each are formed of a plurality of guide curves. The section through the nozzle insert 10 illustrated in FIG. 1*a* is formed to be perpendicular to the axis of rotation of a centrifuge bowl. Accordingly, the sectional plane illustrated in FIG. 1*a* corresponds to a top view of a nozzle insert 10 in a case of application.

The front partial guide curve 12 is formed to be at an angle α to the X-axis. The rear partial guide curve 22 is formed to be at an angle β to the X-axis. The X-axis is a parallel to the inlet opening edge 23. The X-axis represents a horizontal line in relation to the axis of rotation of the bowl.

In the illustrated example, the angle α is 4°. The angle ß is 11° in the illustrated example. In general, it applies that the angle β preferably is larger than the angle α. The angle β in particular is at least twice the angle α.

The axis 24 runs through the center of the outlet opening 13. Together with the perpendicular extension to the cap surface 25, the axis 25 forms the exit angle γ. In the depicted example, the angle γ is 17.5°. In other words, the exit direction of a solid substance or a jet of solid substance is 17.5° to the horizontal axis of the outlet nozzle 40.

The angles & of the radially situated partial guide curves 26 and 27 leading to the outlet opening 13, each are tangentially 15° relative to the axis 24 of the outlet opening 13. The partial guide curves 26 and 22 and the partial guide curves 27 and 21 are connected to one another by means of differently sized curve sections. The radius 1 (R1), for example, is 12 mm, whereas the radius 2 (R2) is 7 mm.

Figure 1B:
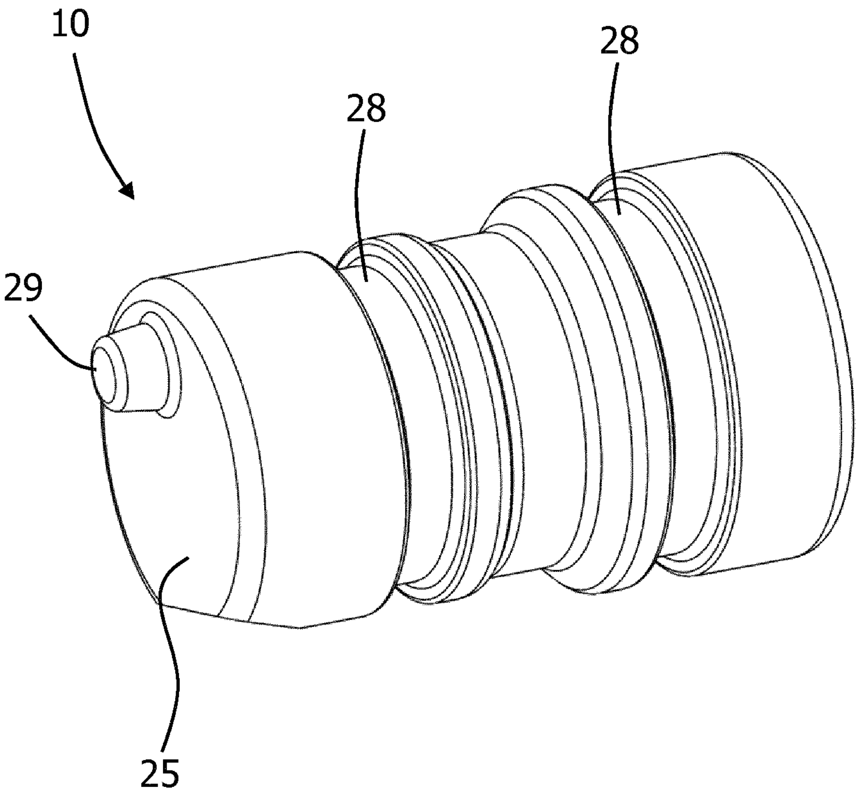
FIG. 1*b* is a perspective view of a nozzle insert.

As can be recognized in particular in FIG. 1*b*, two grooves 28 are formed on the external surface 18 of the nozzle insert 10. Sealing elements, in particular O-rings can be inserted into these groves 28. On the cap surface 25, a positioning element 29, namely a positioning lug is moreover formed. It is formed to be eccentrical to the longitudinal axis which is a perpendicular to the inlet opening 12 or the inlet opening edge 23.

Figure 1C:
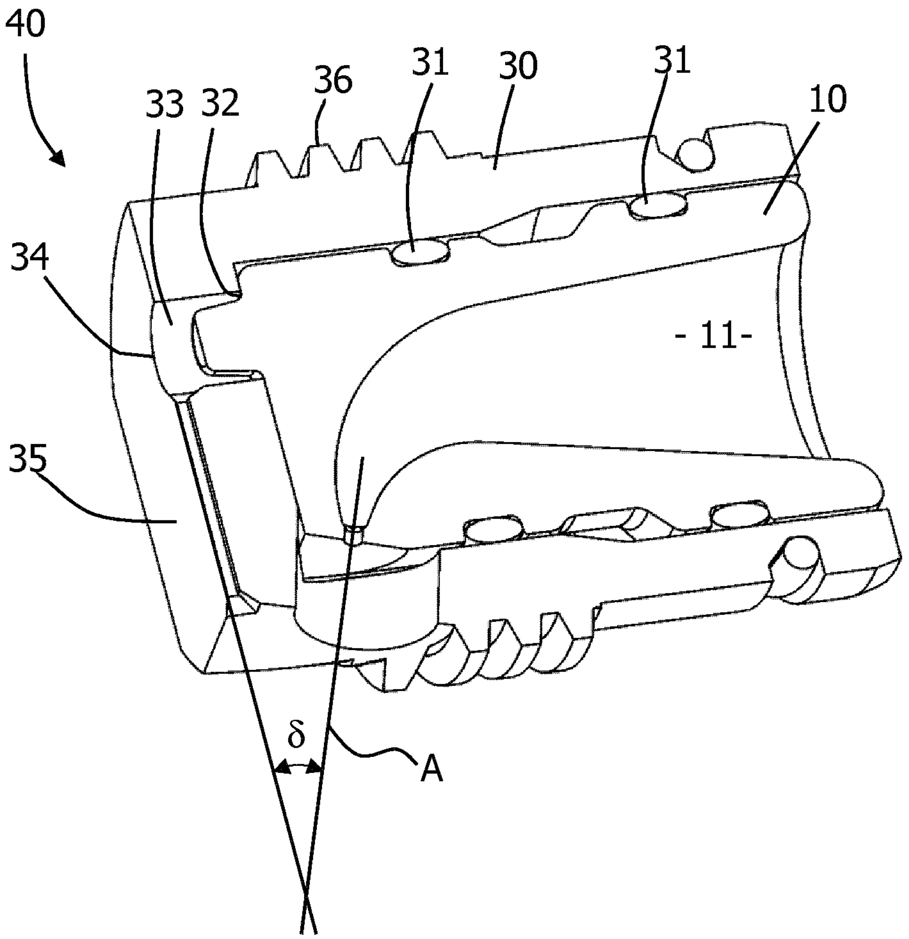
FIG. 1*c* shows a cross-section through an outlet nozzle.
Figure 2:
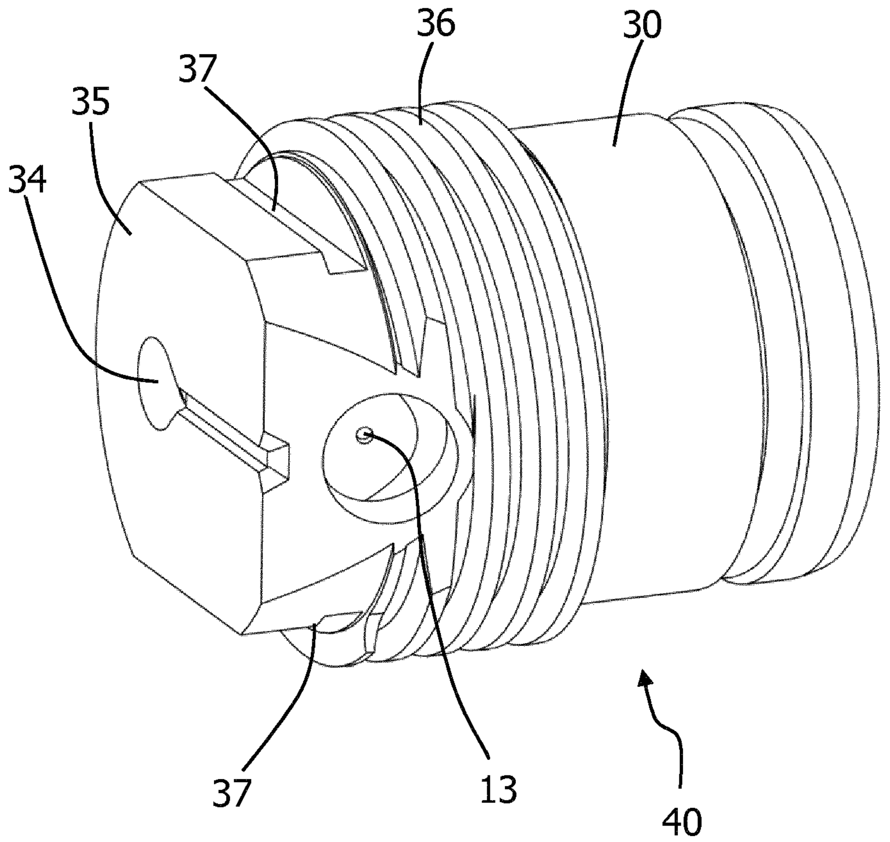
FIG. 2 is a perspective view of a nozzle holder.

In FIG. 1*c*, the nozzle insert 10 is illustrated in the state inserted into the nozzle holder 30. Sealing rings 31 are illustrated within the grooves 28. The positioning element 29 is inserted into a positioning opening 32 of a positioning channel 33 or positioned there. The positioning channel has a further positioning opening 34. As illustrated in FIG. 2, this positioning opening 34 is situated on a planar surface of the nozzle holder 30. The nozzle holder 30 moreover comprises an external thread 36. By means of this external thread 36, the outlet nozzle 40 can be screwed into an opening of a centrifuge bowl.

It can be recognized in FIG. 1*c* that the outflow direction A of the solid substance flowing out solely is defined by the channel 11 of the nozzle insert 10. In other words, the nozzle insert channel 11 corresponds to the flow channel of the outlet nozzle 40. The exit angle δ of the outlet nozzle 40 corresponds to the exit angle γ of the nozzle insert 10.

In FIG. 2, guiding elements 37 of the nozzle holder 30 can moreover be recognized. The guiding elements 37 are in particular formed as dovetail-like guiding elements. These are formed to be complementary to clamping elements of a tool. The guiding elements 37 enable the nozzle holder 30 to be pushed into a tool. Due to the guiding elements 37, a defined orientation of the nozzle holder 30 in relation to a tool is in particular enabled.

Figure 3A:
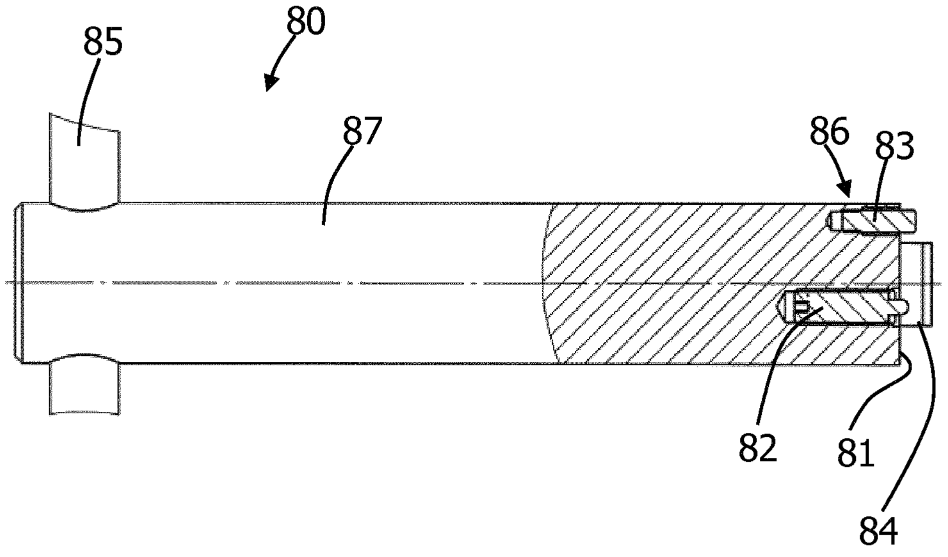
FIG. 3*a* and FIG. 3*b* are a sectional as well as a perspective representation with respect to a tool for mounting and dismounting an outlet nozzle.
Figure 3B:
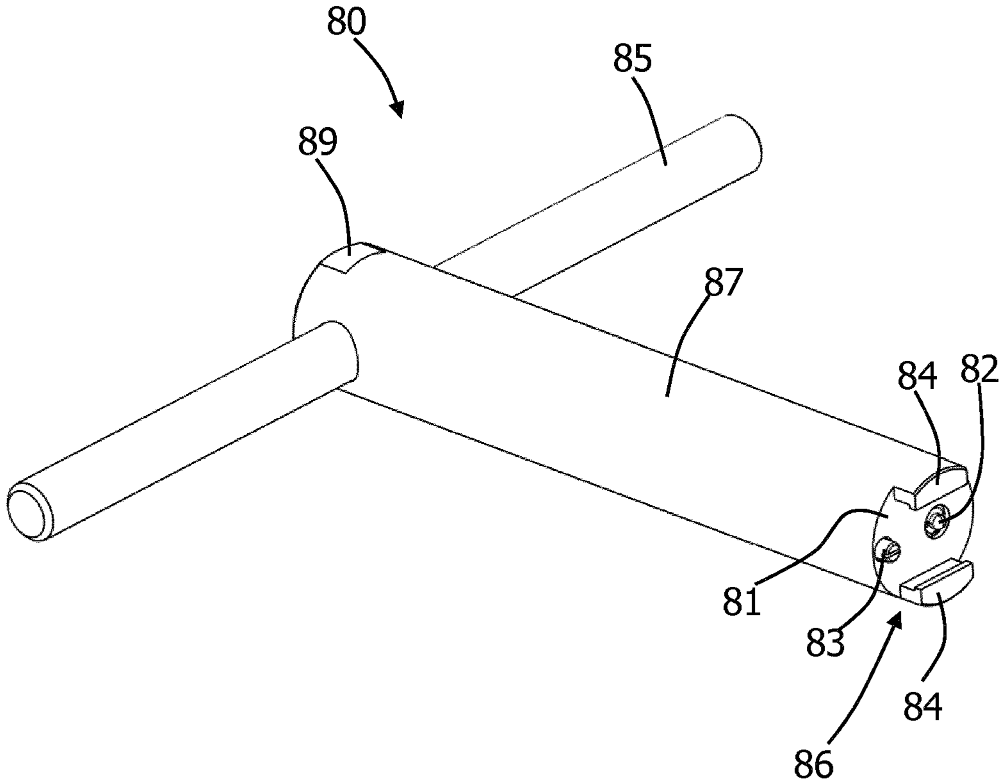

In FIGS. 3*a* and 3*b*, a possible embodiment with respect to a tool 80 is illustrated. In FIG. 3*a*, a partial sectional view is illustrated in this case in the longitudinal direction.

On a mounting surface 81, a spring-loaded latching element 82 can first be recognized. In addition, a further latching element 83 is formed. The further latching element 83 may be formed in the shape of a cylinder pin or threaded pin. The mounting surface 81 relates to the surface of the tool 80 getting into contact with the outlet nozzle 40 to be mounted (see FIG. 4 in this context).

Clamping elements 84 can likewise be recognized. The clamping elements 84 are formed in the shape of two clamping lugs for forming a dovetail-like guide. The height of the clamping elements 84 determines the positioning depth of the outlet nozzle 40. Once the clamping elements 84 abut against a recess bottom (see FIG. 5) of a centrifuge bowl, the outlet nozzle 40 cannot be inserted further into the bowl wall. The clamping elements 84 are formed to be complementary to the guiding elements 37 of the nozzle holder 30. Together with the spring-loaded latching element 82, the further latching element 83 and the clamping elements 84, the mounting surface 81 form a tool head 86. The tool head 86 is formed on a rod 87. At the further end of the rod 87, an actuating handle 85 is formed. At this end of the rod 87, a marking 89 can moreover be recognized. For removing an outlet nozzle 40, the nozzle must be facing upward. In other words, the marking 89 serves as a position indicator. In the illustrated example, this marking 89 is formed as a kind of indentation. A laser inscription, color marking, etc. are conceivable, as well.

Figure 4:
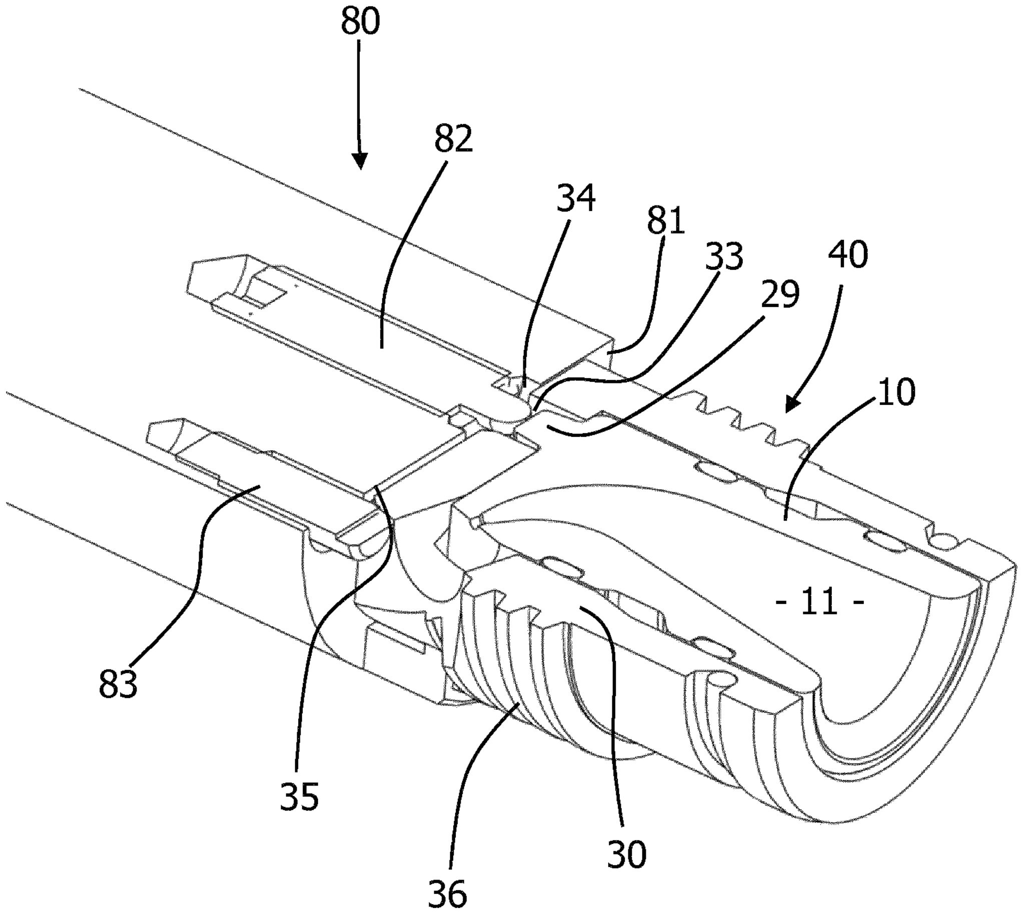
FIG. 4 is a sectional representation with respect to an outlet nozzle attached to a tool.

In FIG. 4, the cooperation between the tool 80 and the outlet nozzle 40, in particular with the nozzle holder 30, is illustrated.

The spring-loaded latching element 82 is inserted into the further positioning opening 34 of the positioning channel 33. In this case, it is the positioning channel 33, within which the positioning element 29 of the nozzle insert 10 is also inserted. The mounting surface 81 of the tool head 86 of the tool 80 rests upon the planar surface 35 of the nozzle holder 30. The spring-loaded latching element 82, the further latching element 83, and the hereto complementary openings of the outlet nozzle 40 are formed such that solely the spring-loaded latching element 82 is insertable into the positioning channel 33, and the further latching element 83 is not insertable. Thus, the nozzle holder 30 is arranged in an exact and clearly defined position in relation to the tool 80.

Figure 5:
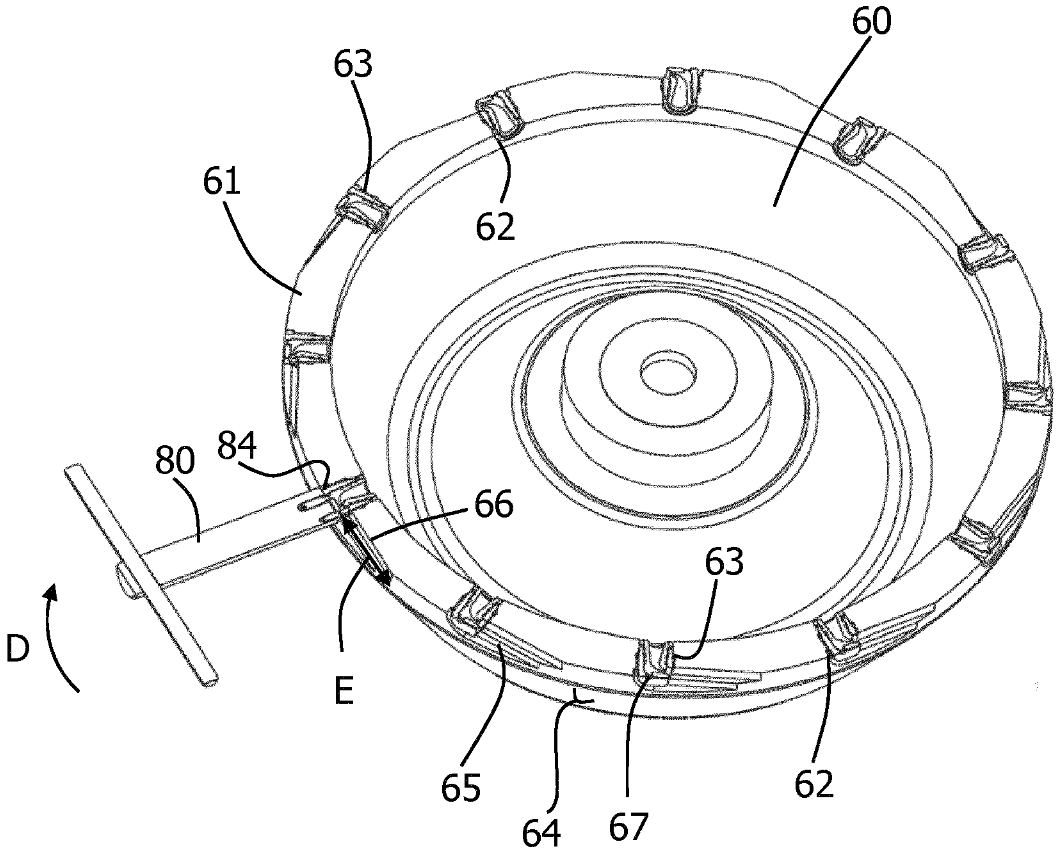
FIG. 5 is a representation with respect to an outlet nozzle to be inserted into a centrifuge bowl.

In FIG. 5, a centrifuge bowl 60 having a bowl wall 61 is illustrated at least in sections. The bowl wall 61 has openings 62. In the openings 62, internal threads 63 are formed in turn. Into the internal threads 63, the external thread 36 of a nozzle holder 30 can be inserted.

In the area of the openings 62, recesses 65 are formed on the external bowl surface 64 each opposite to the direction of rotation D. The recesses 65 form contact edges 66 and contact surfaces 67. The contact edges 66 serve as contact edges for the tool 80, in particular for the tool head 86. It can be recognized that, when an outlet nozzle 40 is completely screwed in, the clamping elements 84 of the tool 80 rest upon contact surfaces 67 which can also be designated as recess bottom. The outlet nozzle 40 then cannot be screwed further into the centrifuge bowl 60. The positioning depth of the outlet nozzle 40 is thus defined by the height of the clamping elements 84.

In FIG. 5 it can be recognized in a very clear manner that the tool 80, due to the dovetail-like guide and the contact edges 66 being formed, can solely be inserted and extracted in a completely defined insertion and extraction direction E. Accordingly, it is also possible for the outlet nozzle 40 to become exactly positioned even without a direct view of the centrifuge bowl 60. The centrifuge bowl 60 usually is situated under a hood that is difficult to access (not illustrated). Due to the defined insertion and extraction direction E and the likewise defined positioning depth, the installing technician is not required to have an unrestricted view of the opening 62.

Figure 6A:
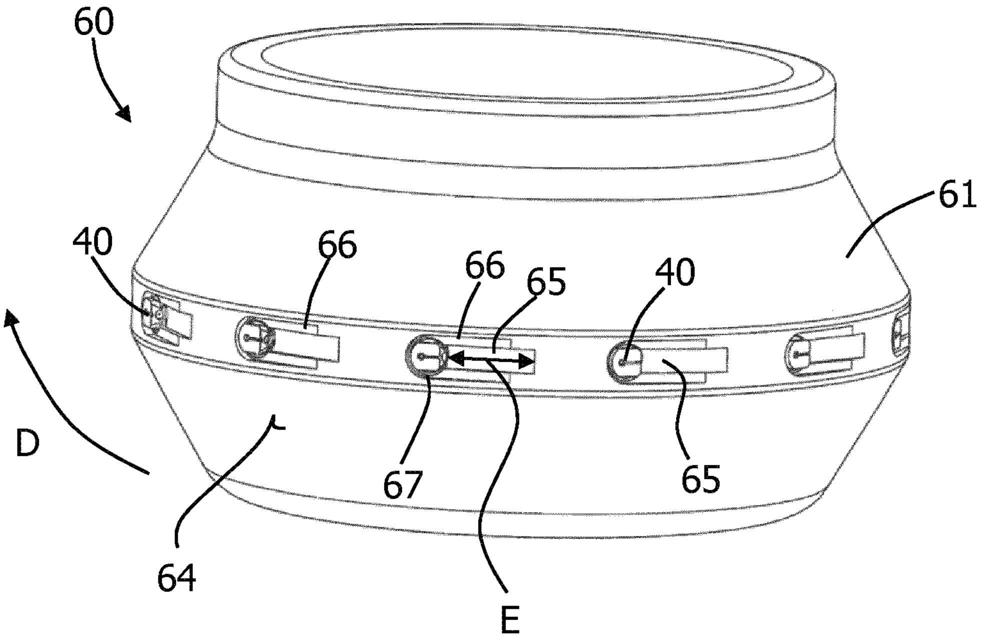
FIG. 6*a* is a representation with respect to a plurality of outlet nozzles inserted into a centrifuge bowl.
Figure 6B:
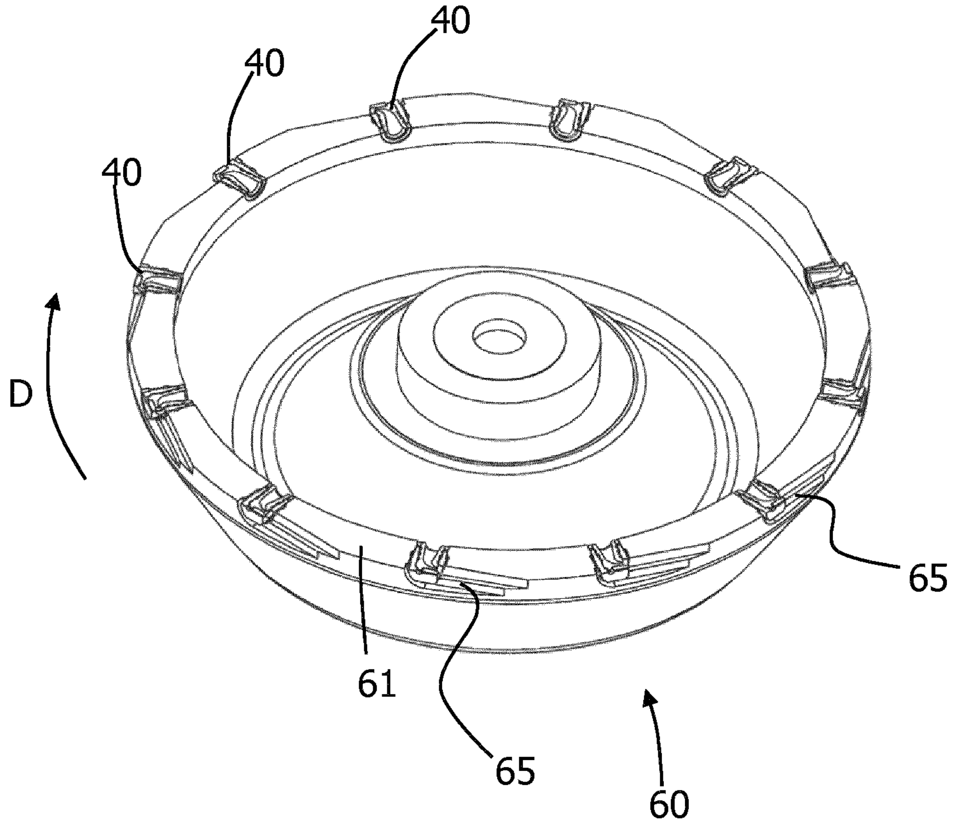
FIG. 6*b* is a sectional representation of a lower bowl part.

In FIGS. 6*a* and 6*b*, several outlet nozzles 40 positioned within the bowl wall 61 are illustrated. It can be recognized that all of the outlet nozzles 40 are exactly positioned with respect to the exit angle δ. All of the outlet nozzles 40 are situated on a common circumferential line of the centrifuge bowl 60.

LIST OF REFERENCE NUMERALS

10 nozzle insert
11 channel
12 inlet opening
13 outlet opening
14 front guide curve
15 rear guide curve
16 ledge
17 wall
18 external surface
19 sectional surface
20 spherical cavity
21 front partial guide curve
22 rear partial guide curve
23 inlet opening edge
24 axis of the center of the outlet opening
25 cap surface
26, 27 partial guide curves
28 groove
29 positioning element
30 nozzle holder
31 sealing ring
32 positioning opening
33 positioning channel
34 further positioning opening
35 planar surface
36 external thread
37 guiding element
40 outlet nozzle
60 centrifuge bowl
61 bowl wall
62 opening
63 thread
64 external bowl surface
65 recess
66 contact edge
67 contact surface
80 tool
81 mounting surface
82 spring-loaded latching element
83 further latching element
84 clamping element
85 actuating handle
86 tool head
87 rod
89 marking
A outflow direction
D direction of rotation of the bowl
E insertion/extraction direction
R1, R2 connecting radii of partial guide curves
α angle of the front partial guide curve
β angle of the rear partial guide curve
γ exit angle
δ exit angle of the outlet nozzle
ε angle

The invention claimed is:

1. An outlet nozzle (40) for a centrifuge bowl (60), comprising:
a nozzle insert (10); and
a nozzle holder (30),
wherein a cap surface (25) of the nozzle insert (10) is arranged axially inwardly of a face surface (35) of the nozzle holder (30),
wherein the nozzle insert (30) is fixed exchangeably in the nozzle holder (30), and wherein the outlet nozzle (40) has a flow channel (11), which determines an exit angle (8) of the outlet nozzle (40).

2. The outlet nozzle (40) according to claim 1, wherein the nozzle insert (30) is clamped in the nozzle holder (30) and wherein the nozzle insert (30) can be removed from the nozzle holder (30) through an inlet-side opening of the nozzle holder (30).

3. The outlet nozzle (40) according to claim 1, wherein the flow channel (11) of the outlet nozzle (40) is formed by the nozzle insert (10) and wherein an outlet opening (13) of the flow channel (11) is radially and axially within the nozzle holder (30).

4. The outlet nozzle (40) according to claim 1, wherein the flow channel (11) is formed to be free from edges, corners, and separating joints.

5. The outlet nozzle (40) according to claim 1, wherein the outlet nozzle (40) does not have a nozzle brick.

6. The outlet nozzle (40) according to claim 1, wherein a wall (17) of the flow channel (11) is formed as a completely defined 3D freeform surface and curved in only one direction.

7. The outlet nozzle (40) according to claim 1, wherein the nozzle insert (10) has a positioning element (29) extending outwardly from the cap surface (25), and wherein the positioning element (29) is positioned in a positioning opening (32) in the face surface (35) of the nozzle holder (30) when in a state fixed within the nozzle holder (30).

8. The outlet nozzle (40) according to claim 7, wherein the positioning element (29) is a positioning pin that is eccentrical to a longitudinal axis of an inlet opening (12) of the flow channel (11).

9. The outlet nozzle (40) according to claim 7, wherein the positioning opening (32) of the nozzle holder (30) is formed as a part of a positioning channel (33), and wherein a component of a tool (80) is inserted or insertable in a further positioning opening (34) of the positioning channel (33).

10. The outlet nozzle (40) according to claim 1, wherein the nozzle holder (30) has an external thread (36) for connecting to a centrifuge bowl (60).

11. A nozzle insert (10) for an outlet nozzle (40) according to claim 1, wherein the flow channel (11) of the nozzle insert (10) forms the flow channel (11) of the outlet nozzle (40), which determines the exit angle (8) of the outlet nozzle (40).

12. A centrifuge bowl (60) with a bowl wall (61) having a plurality of circumferentially distributed openings (62) for receiving outlet nozzles (40), wherein at least one of the outlet nozzles (40) comprises a nozzle insert (10), and a nozzle holder (30), wherein a cap surface (25) of the nozzle insert (10) is arranged axially inwardly of a face surface (35) of the nozzle holder (30), wherein the nozzle insert (10) is fixed exchangeably in the nozzle holder (30), wherein the at least one of the outlet nozzles (40) has a flow channel (11), which determines an exit angle (0) of the at least one of the outlet nozzles (40).

13. The centrifuge bowl (60) according to claim 12, wherein recesses (65) are formed on an external bowl surface (64) of the centrifuge bowl (60), each of the recesses (65) being opposite to a direction of rotation (D) in an area of one of the openings (62), and wherein the recesses (65) constitute contact edges (66) and/or contact surfaces (67) for a tool (80).

14. A method for mounting an outlet nozzle (40) into an opening (62) in a bowl wall (61) of a centrifuge bowl (60), comprising:

a) providing the centrifuge bowl (60);

b) providing the outlet nozzle (40), wherein the outlet nozzle (40) comprises a nozzle insert (10) and a nozzle holder (30), wherein a cap surface (25) of the nozzle insert (10) is arranged axially inwardly of a face surface (35) of the nozzle holder (30), wherein the nozzle insert (10) is fixed exchangeably in the nozzle holder (30), and wherein the outlet nozzle (40) has a flow channel (11), which determines an exit angle (δ) of the outlet nozzle (40);

c) attaching a tool (80) to the nozzle holder (30) of the outlet nozzle (40);

d) screwing in the outlet nozzle (40) into the opening (62) until a defined positioning depth is reached.

15. The method according to claim 14, wherein step b) comprises mounting the nozzle insert (10) into the nozzle holder (30).

16. The method according to claim 14, further comprising removing the tool (80) after performing step d), wherein the tool (80) can only be removed if the outlet nozzle (40) is correctly positioned within the opening (62) and the tool (80) is accordingly positioned in relation to contact edges (66) and/or contact surfaces (67) of the bowl wall (61).

* * * * *